June 29, 1943.	W. E. HUMRICHOUSE ET AL	2,323,274
GASEOUS FUEL GENERATOR
Filed Jan. 31, 1941	5 Sheets-Sheet 1

Inventors
Walter E. Humrichouse
Davis B. Humrichouse
By Clarence A. O'Brien
Attorney

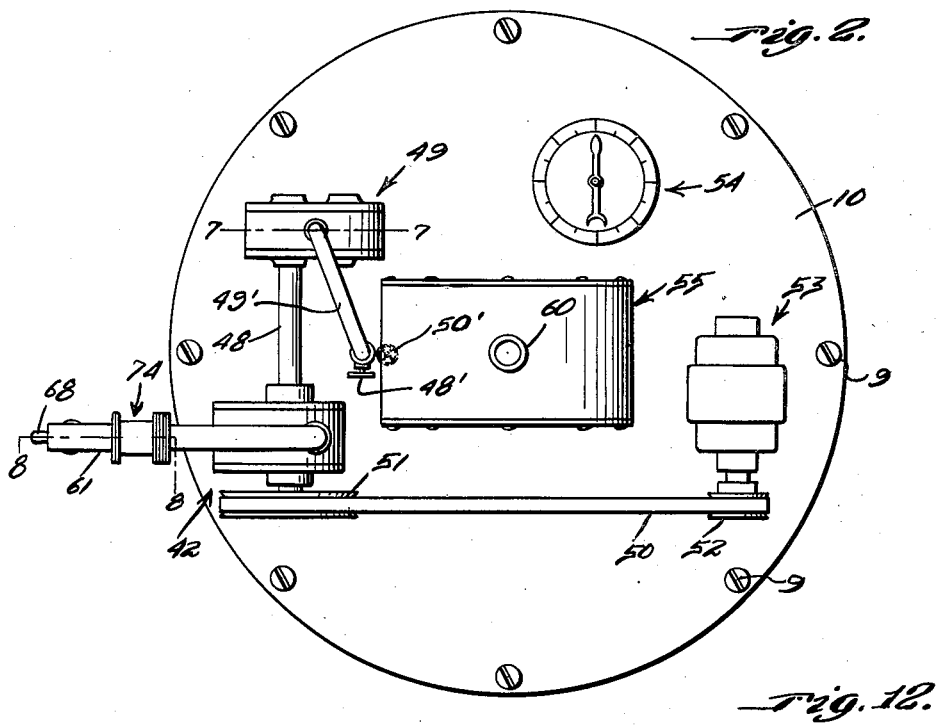
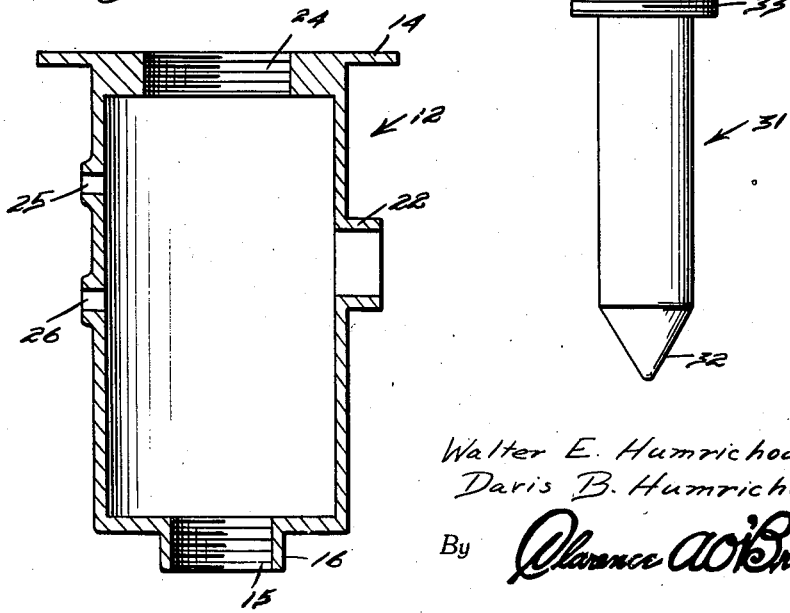

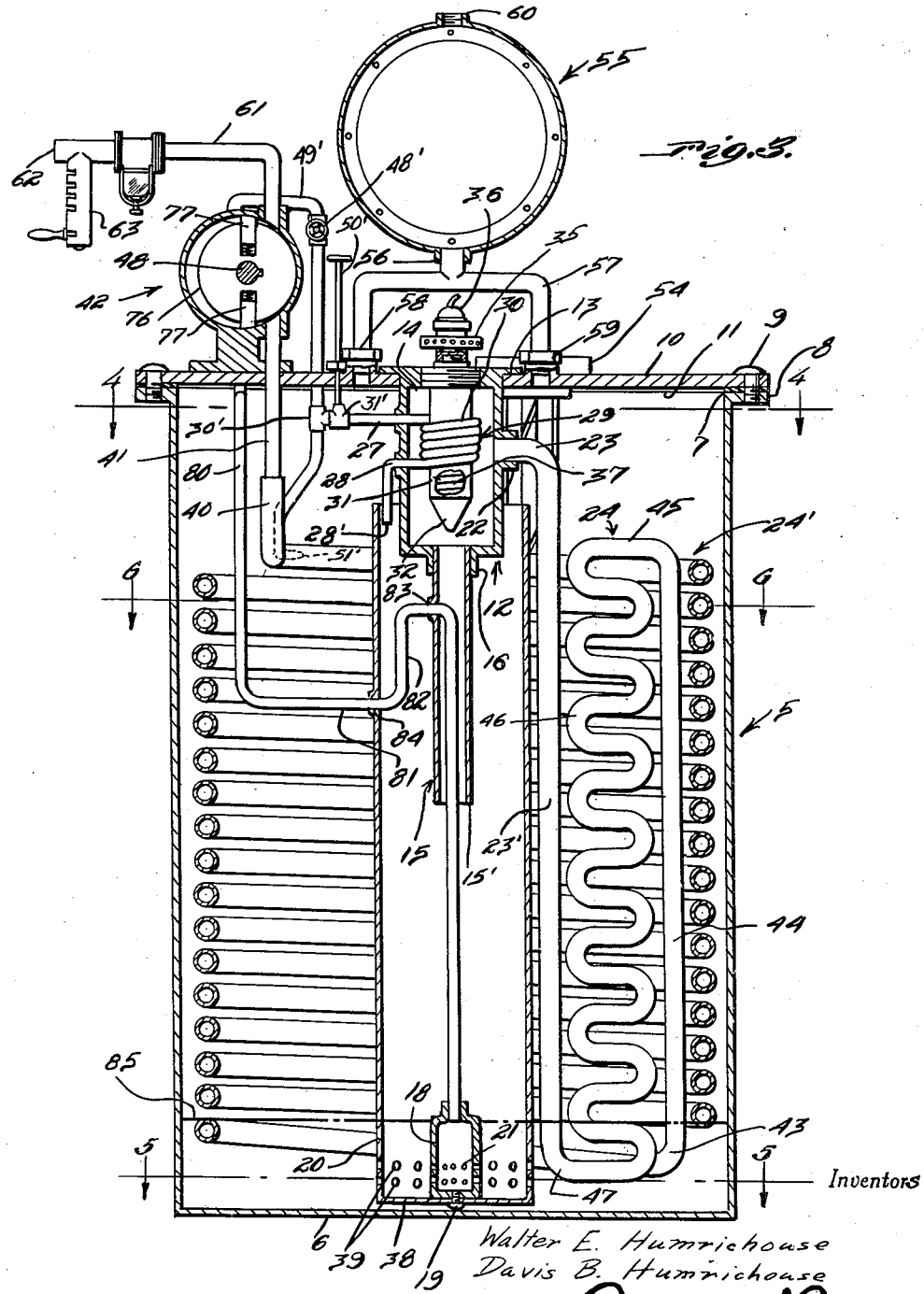

June 29, 1943.   W. E. HUMRICHOUSE ET AL   2,323,274
GASEOUS FUEL GENERATOR
Filed Jan. 31, 1941   5 Sheets-Sheet 4
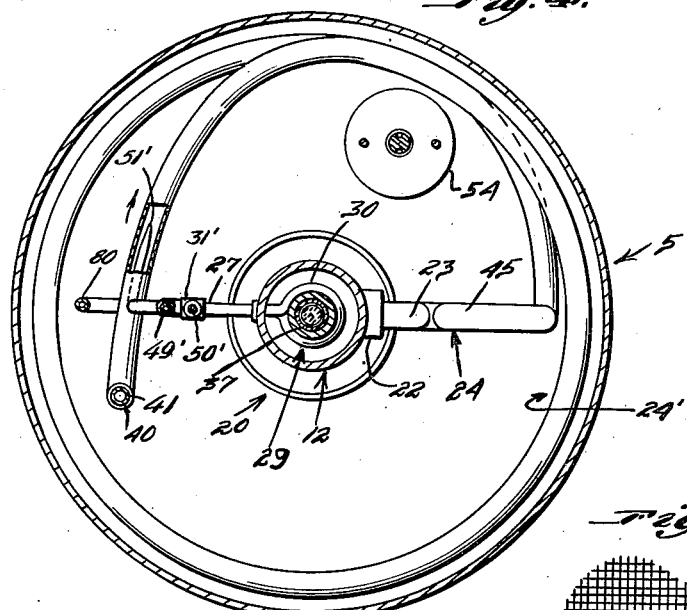
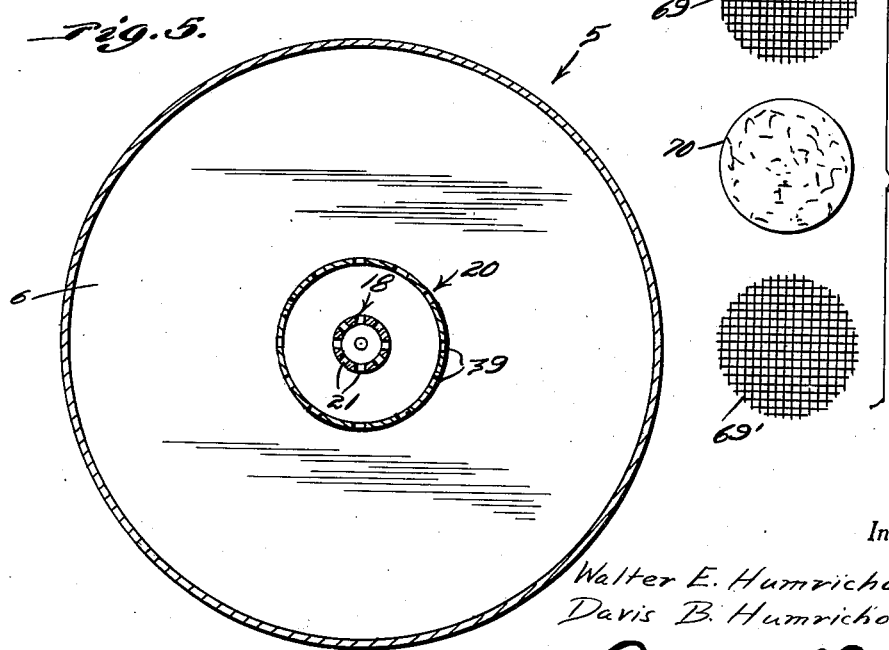
Inventors
Walter E. Humrichouse
Davis B. Humrichouse
By Clarence A. O'Brien
Attorney

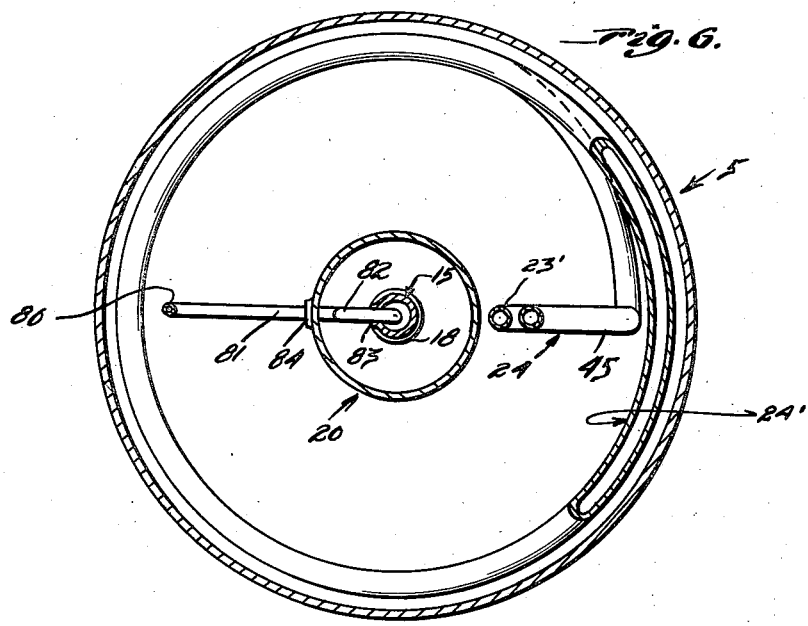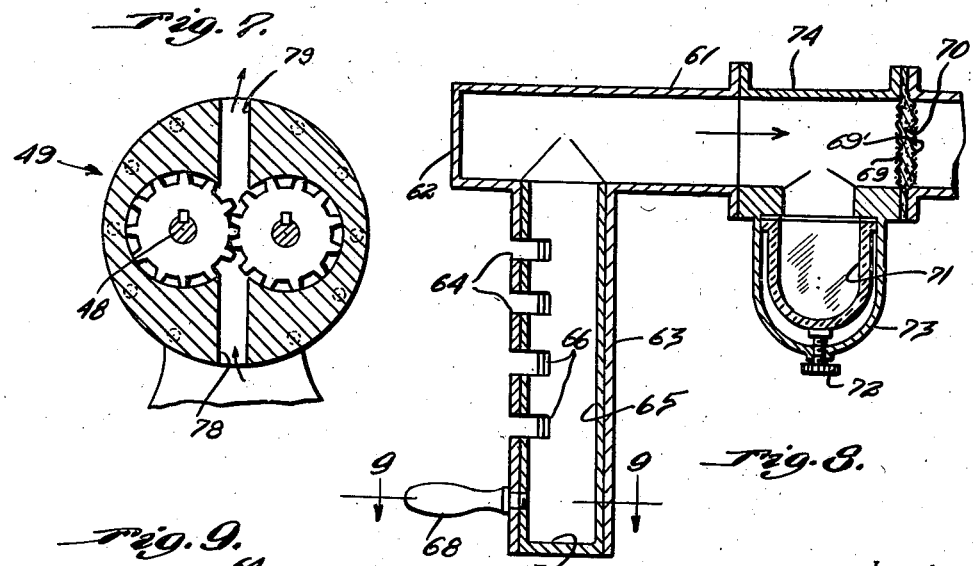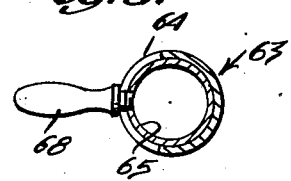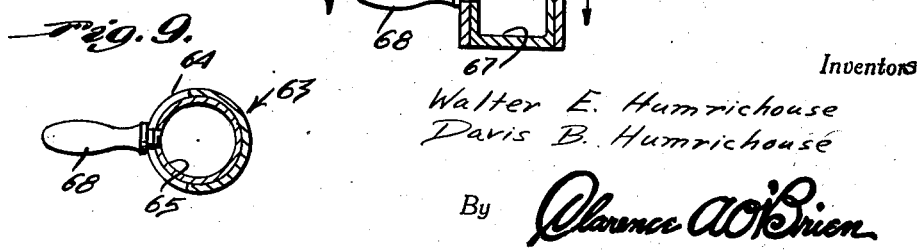

Patented June 29, 1943

2,323,274

UNITED STATES PATENT OFFICE 2,323,274

GASEOUS FUEL GENERATOR

Walter E. Humrichouse and Davis B. Humrichouse, Baltimore, Md., assignors, by direct and mesne assignments, to The Air Gas Company, Baltimore, Md., a corporation of Maryland Application January 31, 1941, Serial No. 376,934

7 Claims. (Cl. 48—144)

Our invention relates to improvements in means for generating or producing gaseous fuel from volatile and semivolatile liquids, and the primary object of our invention is to provide an efficient and practical device of this character especially in portable form, and particularly adapted to the operation of automobile internal combustion engines, lamps, heating and cooking stoves and burners, and other devices requiring a cleanly combustible aeriform fuel.

Another important object of our invention is to provide gaseous fuel generating means of the character indicated which involves a minimum consumption of the volatile or semi-volatile material from which the gaseous fuel is produced through contact of atmospheric air therewith under special and controlled conditions as set forth herein below.

Other important objects and advantages of our invention will be apparent from a reading of the following description taken in connection with the appended drawings, wherein for purposes of illustration we have shown a preferred embodiment of our invention.

In the drawings:

Figure 2 is a top plan view of Figure 1.

Figure 3 is a vertical longitudinal sectional view taken through Figure 1 approximately centrally.

Figure 4 is a horizontal sectional view taken along the line 4—4 of Figure 3 and looking in the direction of the arrows.

Figure 5 is a horizontal sectional view taken through Figure 3 along the line 5—5 and looking in the direction of the arrows.

Figure 6 is a horizontal sectional view taken along the line 6—6 of Figure 3 and looking downwardly in the direction of the arrows.

Figure 7 is a longitudinal sectional view taken through Figure 2 along the line 7—7.

Figure 8 is a fragmentary enlarged longitudinal sectional view taken along the line 8—8 of Figure 2.

Figure 9 is a horizontal sectional view taken along the line 9—9 of Figure 8 and looking in the direction of the arrows.

Figure 10 is a group perspective view of the filter disks.

Figure 11 is an enlarged longitudinal vertical sectional view taken through the warming chamber.

Figure 12 is an enlarged side elevational view of the heater casing.

Figure 1:
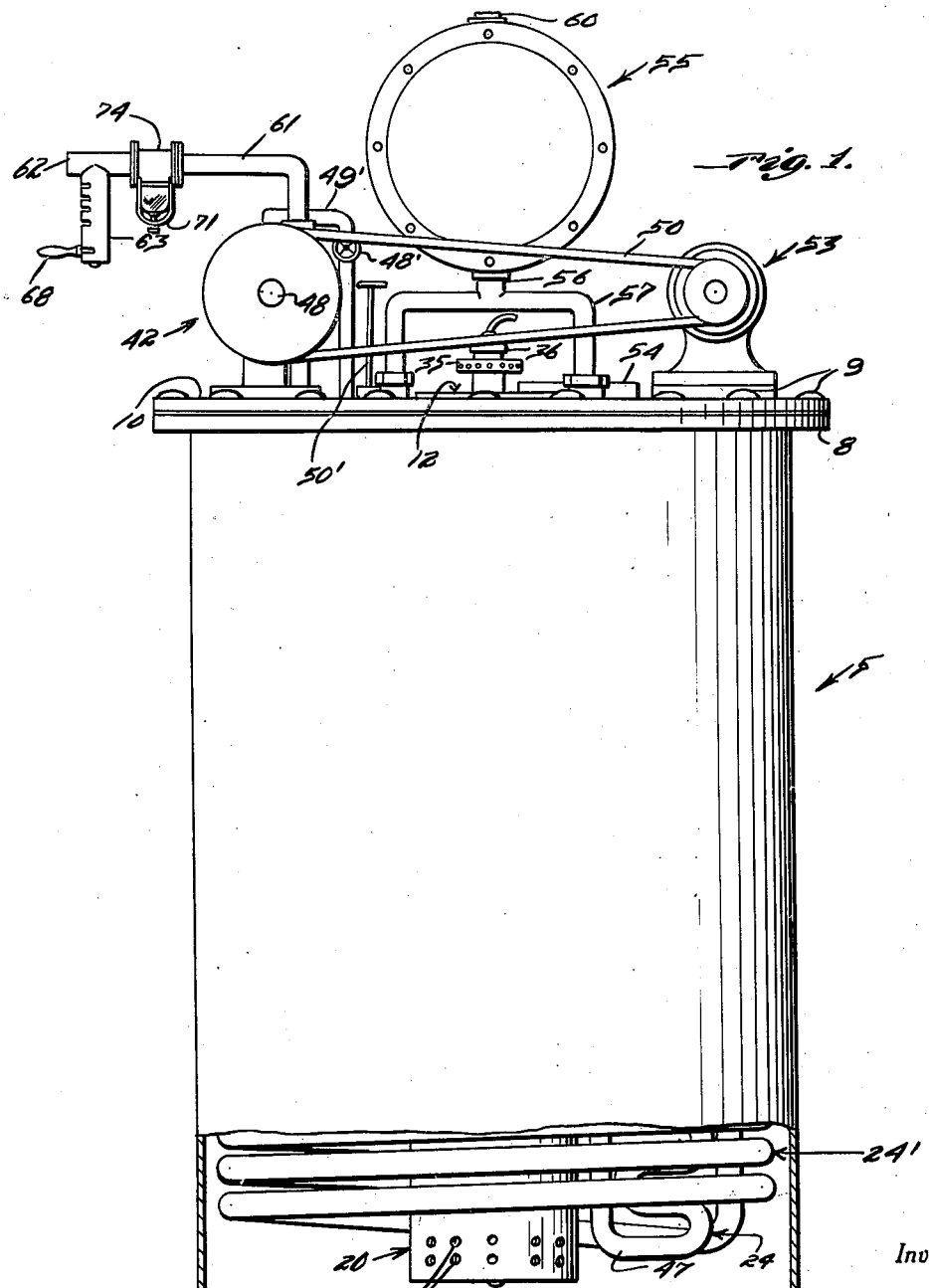
Figure 1 is a general side elevational view of the embodiment partly broken away to disclose the lower part of interior mechanism.

Referring in detail to the drawings, the numeral 5 generally designates a preferably cylindrical vertically elongated metal housing characterized by a closed bottom 6 and an open top 7 provided with a lateral flange 8 to which is bolted at 9 the cover plate 10, with a suitable gasket 11 sealing the joint between the cover plate 10 and the top of the container. The container and the cover plate are of suitable gauge metal to house the structure and mechanism therein which is devoted to the formation of the gaseous fuel and to contain the volatile or semi-volatile material used as the catalyzer in the production of the gas.

The generating mechanism per se comprises the vertically elongated cylindrical warming chamber 12 which is anchored in a central hole 13 in the cover plate 10 with a lateral flange 14 resting on the top of the cover plate to afford the necessary support for the warming chamber. A gas and vapor return tube 15 depends from the bottom of the warming chamber 12, the upper end of the tube being threaded into a depending neck 16 on the bottom of the said chamber. The lower end of the tube 15 is open and spaced upwardly as indicated by the numeral 15′ from the liquid level 85. The chamber 12 has another connection in the form of a radially outwardly extending nipple or neck 22 at a point above its middle into which is connected the upper end 23 of the straight vertical portion 23′ of the shaker coil 24. The opposite side of the warming chamber 12 is traversed by upper and lower small openings 25 and 26 (see Figure 11) through which upper and lower portions 27 and 28, respectively, of the small coiled pipe 29 extend. Its helical portion 30 is circumposed on an intermediate portion of the exterior of the electrical heating element casing 31, the latter being vertically cylindrical in form and provided with a tapering bottom 32 whose apex is somewhat spaced above the bottom of the chamber 12 and over the upper end of the pipe 15. The heating element casing 31 has an enlarged threaded head 33 (see Figure 12) which threads into an opening in the top of the chamber 12. A reduced threaded portion 34 extends above the enlargement 33 and has mounted thereon the adjustable rheostat 35 surmounted by the electrical plug connection 36, whereby the substantially helical and vertically elongated electrical heating element 37 within the casing 31 may be energized to a selected temperature so as to heat the fluid in the helical portion 30 of the small pipe 29 and also the atmosphere and moisture within the warming chamber 12, and the mixture of liquid and air in the upper part of the return tube 15, to assist in the amalgamation and proper attenuation of the mixture of air and liquid, to produce the desired aeriform or gaseous fuel, when circumstances such as low outside temperature or a poor grade of volatile material is used.

The lower part of the chamber 12 is concentrically spaced from and within the upper part of the cylindrical gas well 20 which extends to a point immediately adjacent the bottom 6 of the generator housing 5, the well 20 having the closed bottom 38 and the side walls having rows of perforations 39 near the bottom. Suitable means (not shown) are provided for supporting the gas well 20 in the described relation to the balance of the structure, with any desired or required degree of rigidity consistent with replaceability.

The lower section 28 of the small coiled pipe 29 is depressed and empties into the top of the gas well 20 at 28'. The upper section 27 of this small pipe is connected at 30' with the liquid pump discharge pipe 49', with a flow restricting hand valve 31' preceding the connection to predetermine a small flow of liquid fuel through the pipe 29.

The master pipe coil 24' is for compactness contracted into the form of a helix whose convolutions are closely spaced from the inner surface of the outer walls of the housing 5. The master coil is preferably copper but may be of other suitable metal. The upper convolution of the master coil is located at a level in the neighborhood of the lower part of the chamber 12, and the bottom convolution is located at a level in the neighborhood of the upper perforations 39 of the gas well 20. The said upper convolution of the master coil 24' has its terminal 40 connected to the lower end of the outlet 41 of the air pump 42, while the terminal 43 of the bottom convolution merges into and forms a part of the lower end of the straight vertical portion 44 of the shaker coil 24 which is located within the master coil or helix and between one side of this helix and the gas well 20 as indicated in Figures 3 and 4. The said straight vertical portion 44 rises to a point on the level with the upper convolution of the master coil whence it turns into a short horizontal portion 45 in a radially inward direction, then merging into the adjacent terminal of a vertical series of S bends 46 which terminate at the point 47 forming a part of the lower end of the straight vertical pipe 23' already mentioned as having its terminal 23 connected to the connection 22 entering the side of the warming chamber 12. It is to be noted that while operation of the heating element 37 is not necessary to the operation of the device, its use accelerates the production of the gaseous fuel under ordinary conditions, and makes possible the normal and efficient production of such gaseous fuel under conditions of sub-normal temperature or when not easily volatilized liquids are used with the atmospheric air for the production of the gaseous fuel.

The atmospheric air pump 42 already alluded to is mounted on the cover plate 10 at one side of the collector 55 and has its rotor on the same shaft 48 as one of the rotors of the liquid pump 49, both pumps being synchronously driven by a belt or the like 50 trained over a pulley 51 on the air pump end of the shaft 48 and over a pulley 52 on a small electric motor 53 secured to the cover plate at the opposite side of the collector 55. As indicated in Figure 2 a suitable liquid level gauge 54 is provided in the cover plate to indicate the level of the liquid in the lower part of the housing 5. The gaseous fuel collector dome 55 is in the form of a short relatively large diameter cylinder arranged on edge in a vertical plane, has a connection 56 with the middle of the bight portion of an inverted U-shaped pipe 57 which has one leg thereof coupled as indicated by the numeral 58 in communication through the cover plate 10 and has its opposite end similarly coupled as indicated by the numeral 59 in communication with the interior of the upper part of the housing 5, the connections 58 and 59 being made at diametrically opposite sides of the warming chamber 12. The gaseous fuel utilization means is connected to the connection 60 at the top of the bell or collector chamber 55, as to the carburetor of an internal combustion engine, or the burner of a heater or illumination means, (not shown).

The atmospheric air pump 42 has a horizontal tubular portion 61 which has a closed outer end 62 adjacent to which is a depending cylindrical portion 63 which is formed with a vertically spaced series of segmental air inlet slots 64. Turning snugly within the cylindrical portion 63 is a rotatable valve cylinder 65 which has slots 66 matching the slots 64 and a closed bottom 67. A handle 68 on the valve cylinder 65 extending through a suitable slot in the lower part of the outer cylinder 63 enables manually adjusting the rotatable valve cylinder 65 so as to register more or less of the slots 64 and 66, so as thereby to control the intake of air. Between the manual valve described and the opposite end of the horizontal portion 61 of the air pump intake is a screen arrangement shown in detail in Figure 8 of the drawings which involves a pair of fine mesh metal or similarly effective screens 69 and 69', between which is located a fibrous material screen 70. A removable particle trap 71, preferably in the form of a glass bowl is supported in place by a screw 72 threaded through a cage 73 attached to the fitting 74 which precedes the screens. By the means described the dust and dirt content and a certain amount of the moisture in the incoming air is stripped therefrom and deposited in the bowl 71 which is removable for cleaning purposes.

The air pump 42 is preferably of the rotary type involving an eccentric rotor 76 having diametrically opposed outwardly spring-pressed blades or vanes 77, with the intake and outlet of the pump arranged in axial alignment and in substantially tangential relation to the rotor chamber, as indicated in Figure 3 of the drawings, whereby a substantially even and non-pulsating column of air is forced into the end 40 of the master coil 24', and passed through the various convolutions and other portions of the master coil, terminating in the warming chamber 12.

The liquid pump 49 is preferably of the gear type shown in Figure 7 or of some other suitable non-pulsating type, with its intake port 78 substantially axially aligned with its discharge or outlet port 79. The small pipe 29 has already been described as having its upper portion 27 connected at 30' to pipe 49' leading from the discharge port 79. The pipe 49' is provided with a hand valve 48'. The intake port 78 of the liquid pump has connected thereto the depending small pipe 80 which depends into the upper part of the master coil at the side thereof opposite the shaker coil 24 to a level below the upper convolutions of the master coil, whence the small pipe 80 is horizontally turned in a radially inward direction as indicated by the numeral 81, passes through the side of the well 20 at 84 and then rises for a short distance as indicated by the numeral 82, and passes at 83 through the side of the return tube 15 forming a goose neck trap. The portion of the small tube 80 within the return tube 15 depends substantially axially therein and below the lower end 15' of the return tube, to the bottom of the housing where it is provided with a screen 18 to exclude dirt particles.

A suitable liquid for use in the described device is alcohol, although other volatile and semi-volatile liquids can be used, such as kerosene, crude oil, gasoline, acetone and others, and water solutions thereof. Only a relatively small amount of the liquid need be used, as it is required only that the liquid rise to the level indicated by the numeral 85, to cover the perforations 21 in the inner cup and the perforations 39 in the inner cylinder 20.

The hand valve 31' in the upper arm 27 of the small pipe 29 has its stem rising through the top 10 of the housing and provided with a hand grip 50' for convenient outside adjustment.

The lower part of the liquid pump discharge pipe 49' passes into the upper convolution of the master coil at a point just beyond the terminal 40, the pipe 49' terminating in a jet 51' pointing away from the terminal 40 and concentrically spaced from the interior of the said upper convolution. The jet 51' is arranged to discharge a fine stream or spray of the volatile liquid in the master coil at the same time that atmospheric air from the pipe 41 passes along the sides of the jet in the same direction as the liquid from the jet, thereby forming an intimate and uniform mixture of atmospheric air and liquid which becomes more attenuated or "tapered" as to density as it passes along the interior of the master coil, until at the point of discharge the resultant aeriform fluid is a dry gas. The operation of the air pump and liquid pump being constant, the influx of air is predetermined and controlled by adjustment of the valve 63 and the influx of liquid by adjustment of the hand valve 48' and the hand valve 31'.

To operate the device of the invention, the required kind and amount of volatilizable liquid having been placed in the bottom of the housing 5, the small electric motor 53 is started with the air control valve 63 and the liquid control valve 48' open at least part way, and the restricting valve 31' being open the desired amount. This results in a substantially immediate evolution of the gaseous fuel at the collector dome outlet 60 for operating an internal combustion engine, etc.

The operation of the pumps under the named conditions forces atmospheric air and liquid to mingle at the jet 51' and together pass around and downwardly through the master coil 24'. The passage of the mixture through the extended length of the master coil creates heat by the evaporating action of the air on the liquid particles and through friction with the walls of the coil, which dries the mixture and makes it more homogeneous as it progresses toward the collector. By the time that the resultant reaches the shaker coil 24 it is highly attenuated. As it passes downwardly through the shaker coil 24 at relatively high speed and pressure, the said resultant is violently shaken from side to side by the tortuous and reversed convolutions thereof, with the effect that the said resultant is stripped of any unamalgamated elements, such as moisture and other extraneous matter. The by now aeriform fluid passes from the pipe 23' into the warming chamber 12, where if the heater is working, the aeriform fluid is further amalgamated and attenuated and passes downwardly through the tube 15 into the lower part of the housing and rises in the well 20 around the tube 15, and over the top of the well 20 into the housing 5 and into the collector dome 55. The same things take place when the heater is not in operation and the outside temperature and the volatility of the liquid used are sufficiently high not to require operation of the heater. Where the heater is wanted or needed, the rheostat 35 is adjusted by rotating the exterior thereof to the required temperature setting. The master coil 24' and the shaker coil 24 have relatively elevated temperatures due to the heat produced therein by the friction of the gaseous mixture passing therethrough and by the evaporating action between the air and liquid in the mixture; so that the coils 24' and 24 act to "swell" the body of gas in the housing and keep the gas at the desired temperature. It is obvious that this inherent warming action makes it possible for the liquid pump to pick up and discharge through the jet 51' liquid which keeps rising in temperature until a mean warm temperature has been reached, which favors volatilization of the liquid and facilitates the formation of the desired aeriform fluid or gas.

Adjustment of the richness of the gas is made by manipulating the valves 63 and 48'. Further adjustment according to the liquid used is made by operating the needle valve 31'.

Although we have shown and described herein a preferred embodiment of our invention, it is to be definitely understood that we do not wish to limit the application of the invention thereto, except as may be required by the scope of the subjoined claims.

Having described the invention, what is claimed as new is:

1. A gaseous fuel generator comprising a closed upright housing, a gas well rising in said housing and open at its top, said gas well having a closed bottom with side wall perforations adjacent said bottom, a helical metal pipe master coil concentrically spaced around said gas well, a vertical metal pipe shaker coil situated at one side of said gas well and within said master coil, a chamber depending into the upper end of said gas well, one terminal of said shaker coil opening into said chamber and the remaining terminal of said shaker coil being connected with an end of said master coil, an atmospheric air pump having its intake open to the atmosphere and its outlet side connected to the remaining end of said master pipe coil, a liquid and air mixture recirculating pump on said housing, motor means coordinately driving both pumps, a first relatively small liquid recirculating tube leading from a point adjacent the bottom of said housing and connected at its opposite end to the intake of said recirculating pump, a second relatively small recirculating tube connected to the outlet of said recirculating pump and having a jet discharging into an upper convolution of said master coil in the direction of movement of the air in said master coil, and an outlet on the upper part of said housing for releasing the resultant gaseous fuel.

2. A gaseous fuel generator according to claim 1 wherein said shaker coil comprises a series of vertically succeeding S-convolutions, said series terminating at opposite ends in inner and outer vertically extending pipe portions.

3. A gaseous fuel generator according to claim 1 wherein said intake of said atmospheric air pump comprises a conduit having a lateral branch formed with air inlet openings and a rotatable valve nested in said branch and also formed with inlet openings, and handle means for rotating said valve to adjustably register said inlet openings in the valve and branch to predetermine the amount of atmospheric air admitted to the air pump.

4. A gaseous fuel generator according to claim 1 wherein said intake of said atmospheric air pump comprises a conduit having a lateral branch formed with air inlet openings and a rotatable valve nested in said branch and also formed with inlet openings, and handle means for rotating said valve to adjustably register said inlet openings in the valve and branch to predetermine the amount of atmospheric air admitted to the air pump, air screening and moisture and dirt trap means incorporated in said conduit between said branch and the intake of said air pump.

5. A gaseous fuel generator comprising a closed substantially vertical cylindrical housing, a substantially cylindrical gas well rising concentrically in said housing from a point close to the bottom of said housing, the upper end of said gas well being open and in substantially spaced relation below the top of said housing, the lower end of said gas well being closed except for sidewall perforations opening into the interior of said housing, means for maintaining a body of volatile liquid fuel at a level with said perforations, a helical metal pipe master coil supported concentrically in said housing with its sides closely spaced from the sidewall of said housing and relatively greatly spaced from the sidewall of said gas well, the lower end of said master coil being slightly spaced from the bottom of said housing with the upper end of the master coil spaced below the upper end of said gas well, a chamber depending from the top of the housing and having a portion thereof depending spacedly within the open upper end of said gas well, a vertical shaker coil located between said master coil and said gas well, said shaker coil comprising a first vertical arm rising from and in communication with the lower end of said master coil, said shaker coil further comprising a series of alternately reversed S-convolutions depending from the upper end of said first vertical arm, said series terminating at its lower end in a second vertical arm rising to a point above the remainder of said shaker coil, the upper end of said second arm being connected in communication with an upper part of said chamber, an atmosphere air pump having its discharge connected to the upper end of said master coil, a liquid fuel circulating pump, means for driving said pumps coordinately, a liquid fuel nozzle in said upper end of the master coil beyond the point of connection of the discharge of the air pump, a liquid fuel intake tube leading from the bottom of said gas well to the intake side of said recirculating pump, and a discharge tube connecting the discharge side of said recirculating pump with said nozzle, and gas outlet means on the upper part of said housing.

6. A gaseous fuel generator according to claim 5 wherein screened air intake valve means is arranged to control the admission of atmospheric air into the intake side of said air pump, said valve means being adjustable to predetermine the richness of the generated gas issuing from said gas outlet means.

7. A gaseous fuel generator according to claim 5 wherein said master coil consists of a single helix.

WALTER E. HUMRICHOUSE.
DAVIS B. HUMRICHOUSE.